United States Patent [19]

Ishii et al.

[11] Patent Number: 5,556,349

[45] Date of Patent: Sep. 17, 1996

[54] SHIFT CONTROL APPARATUS FOR AUTOMATIC TRANSMISSION

[75] Inventors: Shigeru Ishii, Atsugi; Yoshihide Shinso; Takeki Jozaki, both of Zama; Shigeki Shimanaka, Hadano; Shuji Kurokawa, Machida; Hideharu Yamamoto, Odawara, all of Japan

[73] Assignee: Nissan Motor Co., Ltd., Yokohama, Japan

[21] Appl. No.: 429,502

[22] Filed: Apr. 26, 1995

[30] Foreign Application Priority Data

Apr. 28, 1994 [JP] Japan .................................. 6-092350

[51] Int. Cl.$^6$ .................................................. B60K 41/02
[52] U.S. Cl. ........................... 477/76; 477/78; 477/97
[58] Field of Search ............................. 477/76, 77, 78, 477/97, 98

[56] References Cited

U.S. PATENT DOCUMENTS

| | | | |
|---|---|---|---|
| 5,157,991 | 10/1992 | Sumimoto | 477/98 |
| 5,261,295 | 11/1993 | Iwanaga et al. | 477/98 |
| 5,275,069 | 1/1994 | Baba et al. | 477/98 X |
| 5,307,269 | 4/1994 | Kohno | 477/98 X |
| 5,315,897 | 5/1994 | Abe et al. | 477/98 |
| 5,345,843 | 9/1994 | Fujita et al. | 477/98 |
| 5,347,885 | 9/1994 | Taga et al. | 477/76 X |
| 5,425,687 | 6/1995 | Taga et al. | 477/97 X |

FOREIGN PATENT DOCUMENTS 62-74726  4/1987  Japan .

OTHER PUBLICATIONS

Service Manual of NISSAN RE 5R01A, (Jun. 1989), p. A–7.

*Primary Examiner*—Charles A. Marmor
*Assistant Examiner*—Peter Kwon
*Attorney, Agent, or Firm*—Foley & Lardner

[57] ABSTRACT

A shift control apparatus for an automatic transmission provides a normal-temperature shift pattern and a high-temperature shift pattern. The high-temperature shift pattern is selected when a transmission fluid temperature satisfies a predetermined condition. The switching of the shift pattern is inhibited if the vehicle speed is lower than a predetermined speed, even when the temperature related to the transmission or engine has been judged to be higher than a predetermined temperature.

3 Claims, 4 Drawing Sheets

5,556,349

SHIFT CONTROL APPARATUS FOR AUTOMATIC TRANSMISSION

BACKGROUND OF THE INVENTION

1. Field of the Present Invention

The present invention relates to a shift control apparatus for an automatic transmission, which performs a shift operation of the transmission in accordance with the driving state of an automotive vehicle.

2. Description of the Related Art

An automatic transmission selects a speed range by selectively engaging various friction devices (e.g., clutches and brakes, etc.) and performs the speed change (the up-shift speed change and the down-shift speed change) to obtain any other speed (the position of the gear) by engaging or disengaging the friction devices. It is a conventional practice to predetermine a plurality of shift patterns corresponding to various parameters related to the driving state of the vehicle, such as vehicle speed, throttle opening, temperature of transmission oil and the like, to select a particular shift pattern which is appropriate for a current driving state, and to perform the shift control on the basis of the selected pattern.

There is known an automatic transmission provided with a mode change-over switch adapted to be selected and operated by a driver, which includes an "AUTO" position, a "POWER" position and a "SNOW" position. When the "POWER" position is selected, the shift pattern is fixed to an acceleration-oriented "power pattern". When the "SNOW" position is selected, the shift pattern is fixed to a "snow pattern" which is suitable for a snowy road. When the "AUTO" position is selected, i.e., when neither "POWER" position nor "SNOW" position is selected, the shift pattern is automatically switched to either one of the above-mentioned "power pattern" and an economy-oriented "economy pattern" in accordance with the driving state. Such an automatic transmission is disclosed, for example, in "Service Manual for NISSAN RE5R01A-Type Full-Range Electronically-Controlled Automatic Transmission" page A-7, issued in March 1989 by Nissan Motor Co., Ltd, the assignee of this application.

There is also known an automatic transmission having an ordinary-temperature shift pattern and a high-temperature shift pattern, which can be selected depending upon the temperature related to the transmission or the engine, typically the transmission fluid temperature. In this instance, an automatic transmission controller constantly monitors the transmission fluid temperature and prevents it from being extremely elevated by performing a switching from the ordinary-temperature shift pattern to the high-temperature shift pattern when the transmission fluid temperature becomes higher than a predetermined temperature. The relationship between the ordinary-temperature shift pattern and the high-temperature shift pattern substantially corresponds to the relationship between the above-described "economy pattern" and "power pattern", in that the shift point of the high-temperature shift pattern as compared to that of the normal-temperature shift pattern is set to a higher speed side to perform a shifting operation at a higher speed under the same conditions of the vehicle speed and the transmission fluid temperature. Such an automatic transmission is disclosed, for example, in Japanese Patent Laid-open Publication No. 62-74,726.

In the prior art automatic transmission that performs switching between a plurality of shift patterns in accordance with the transmission fluid temperature, for suppressing heat generation within the torque converter in a high temperature condition of the transmission fluid, the current shift pattern for normal temperature condition shown in FIG. 4A is switched into another shift pattern for high temperature condition shown in FIG. 4B. By this, the region for driving at a lower speed range (e.g., the second or third speed range in a four-speed automatic transmission) is extended as compared to the shift pattern for the normal temperature condition. Therefore, an increase in the transmission fluid temperature may involve an unintended shifting operation based on newly selected shift pattern, irrespectively of increase in the vehicle speed when depressing an accelerator pedal during a high-load driving, such as a up-hill driving, thereby giving unpleasant feel to the driver and/or passengers. This becomes marked upon occurrence of unintended shift operation skipping an intermediate speed range, e.g., from the top or fourth speed range to the second speed range in the case of a four-speed automatic transmission.

SUMMARY OF THE INVENTION

It is therefore an object of the present invention to provide an improved shift control apparatus for an automatic transmission, that performs switching between a plurality of shift patterns in accordance with the transmission fluid temperature, without causing an undesirable shifting operation upon increase in a temperature related to the transmission or engine.

The present invention is based on a novel concept that undesirable shifting operation upon increase in a temperature related to the transmission or engine can be effectively avoided by inhibiting the switching of the shift pattern even when the temperature is higher than a predetermined temperature, depending upon the vehicle speed.

According to the present invention, there is provided a shift control apparatus for a vehicle automatic transmission comprising: a normal-temperature shift control means for providing a first shift pattern and performing a shift operation under a normal temperature condition, based on said first shift pattern; a high-temperature shift control means for providing a second shift pattern and performing a shift operation under a high temperature condition, based on said second shift pattern; a temperature detecting means for detecting a temperature which is related to at least one of an automatic transmission and an engine connected to said transmission; a high-temperature judging means for judging whether or not the temperature detected by said temperature detecting means is higher than a predetermined temperature; a shift pattern switching means for performing a switching between said normal-temperature shift control means and said high-temperature shift control means, and activating said high-temperature shift control means when the temperature detected by said temperature detecting means has been judged to be higher than said predetermined temperature; a vehicle speed detecting means for detecting a vehicle speed; and a shift pattern switching inhibiting means for inhibiting the switching from said normal-temperature shift control means to said high-temperature shift control means by said shift pattern switching means, even when the temperature detected by said temperature detecting means has been judged by said high-temperature judging means to be higher than said predetermined temperature, if the vehicle speed detected by said vehicle speed detecting means is lower than a predetermined speed.

With the above-mentioned arrangement of according to the present invention, when the temperature detected by the temperature detecting means is above the predetermined temperature and judged by the high-temperature judging means to be higher that the predetermined temperature, the shift pattern switching means generates an output command for switching from the normal-temperature shift pattern into the high-temperature shift pattern. On such occasion, however, when the vehicle speed detected by the vehicle speed detecting means is lower than the predetermined speed, the shift pattern switching inhibiting means inhibits the switching to the high-temperature shift control means, so that a shift operation in accordance with the current driving state is performed based on the currently selected normal temperature shift pattern. It is thus possible to prevent occurrence of undesirable shifting operation upon increase in a temperature related to the transmission or engine.

Advantageously, the shift control apparatus further comprises a shift pattern switching inhibition releasing means for releasing the inhibition of the switching between said normal-temperature shift control means and said high-temperature shift control means, so that when a shift operation is to be made with the switching from said normal-temperature shift control means inhibited by said shift pattern switching inhibiting means, said shift pattern switching inhibiting means is released and a switching into said high-temperature shift control means is performed.

Furthermore, the temperature to be detected by the temperature detecting means may be a transmission fluid temperature. In this instance, the predetermined temperature may be at least approximately 124° C.

BRIEF DESCRIPTION OF THE DRAWINGS

The present invention will now be described in further detail hereinafter, by referring to a specific embodiment shown in the accompanying drawings, in which.

DETAILED DESCRIPTION OF THE PREFERRED EMBODIMENT

Figure 1:
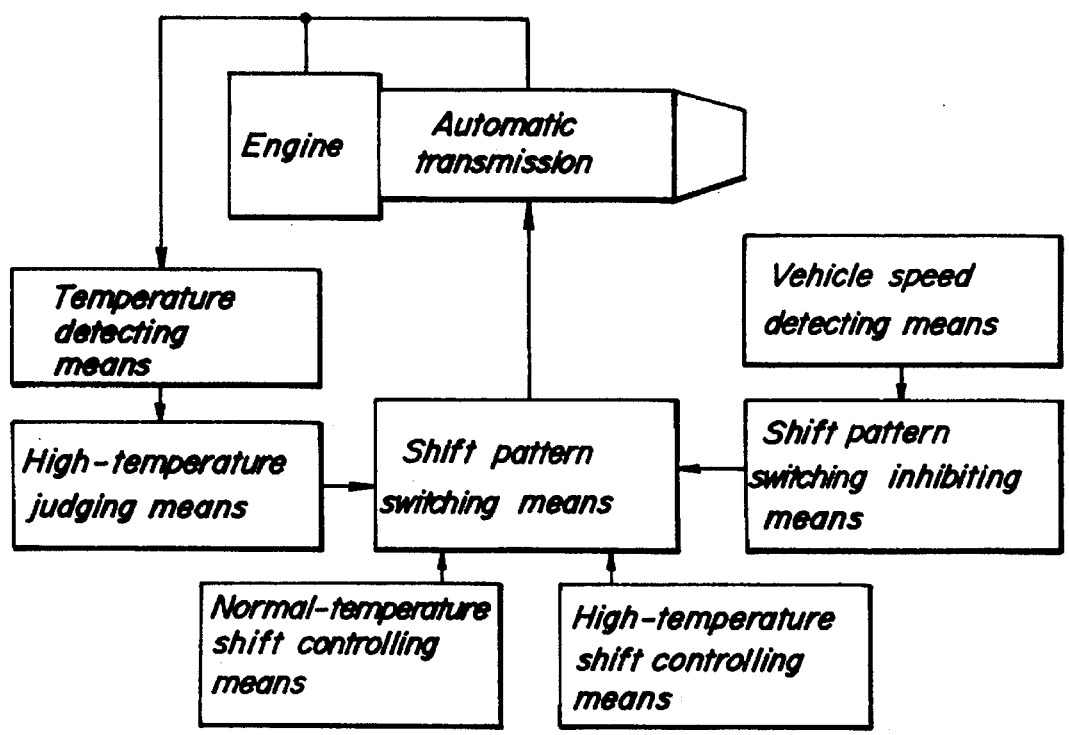
FIG. 1 is a diagram for explaining the basic concept of the present invention.

Referring now to FIG. 1, there is shown a basic concept of the present invention. The shift control apparatus according to the present invention is for an automatic transmission which is driven by an engine. The shift control apparatus includes, as shown in FIG. 1, a normal-temperature shift control means for providing a first shift pattern and performing a shift operation of the transmission under a normal temperature condition, based on the first shift pattern, and a high-temperature shift control means for providing a second shift pattern and performing a shift operation of the transmission under a high temperature condition, based on the second shift pattern. A temperature detecting means serves to detect a temperature which is related to at least one of the automatic transmission and an engine connected to the automatic transmission. A high-temperature judging means serves to judge whether or not the temperature detected by the temperature detecting means is higher than a predetermined temperature. A shift pattern switching means serves to perform a switching between the normal-temperature shift control means and the high-temperature shift control means, and activates the high-temperature shift control means when the temperature detected by the temperature detecting means has been judged to be higher than the predetermined temperature. A shift pattern switching detecting means serves to detect the switching between the normal-temperature shift control means and the high-temperature shift control means by said shift pattern switching means. A vehicle speed detecting means serves to detect a vehicle speed. A shift pattern switching inhibiting means serves to inhibit the switching between the normal-temperature shift control means and the high-temperature shift control means by the shift pattern switching means, even when the temperature detected by the temperature detecting means has been judged by the high-temperature judging means to be higher than the predetermined temperature, if the vehicle speed detected by the vehicle speed detecting means is lower than a predetermined speed.

Figure 2:
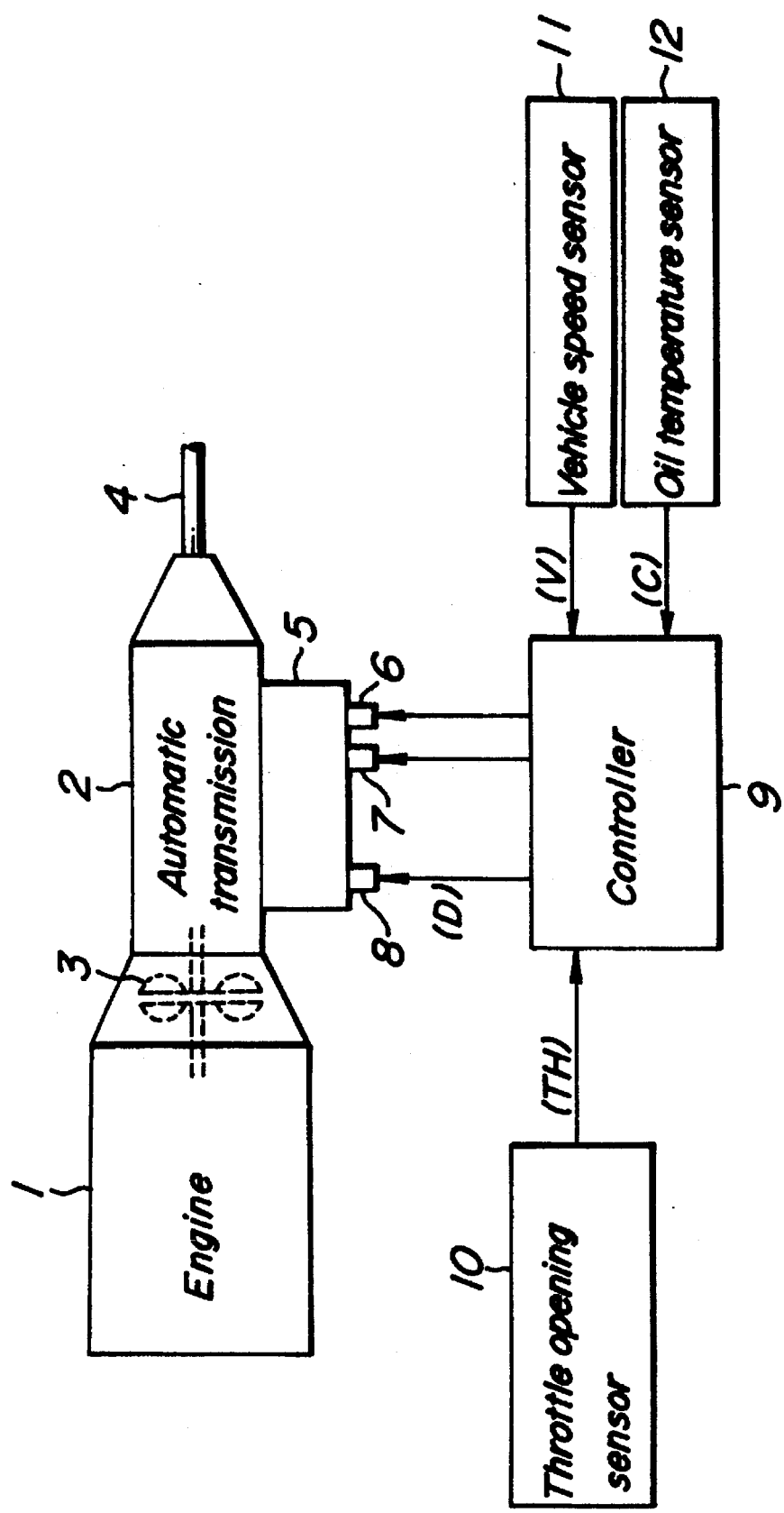
FIG. 2 is a diagram showing the constitution of a preferred embodiment of a shift control apparatus according to the present invention.

FIG. 2 is a diagrammatic representation of the shift control apparatus according to one embodiment the present invention, wherein reference numeral 1 denotes an engine which is connected to an automatic transmission 2. The automatic transmission 2 receives an output power from the engine 1 through a torque converter 3 and changes the input revolutional speed into the output revolutional speed of an output shaft 4, with a gear ratio according to a speed range which is being selected.

The speed range of the automatic transmission 2 is determined by a combination of ON and OFF states of shift solenoids 6 and 7 within a control valve 5, and the torque converter 3 selectively assumes a converter mode in which the input and output elements are not directly connected to each other, and a lock-up mode in which the input and output elements are directly connected to each other by a duty control of a lock-up solenoid 8 within the control valve 5. The following explanations will be made assuming that the automatic transmission 2 has a D range which is currently selected.

There is provided a controller 9 for controlling the ON/OFF states of the shift solenoids 6 and 7 and the driving duty D of the lock-up solenoid 8. The controller 9 is supplied with an input signal from a throttle opening sensor 10 for detecting a throttle opening TH of the engine 1, an input signal from a vehicle speed sensor 11 for detecting a vehicle speed V from the revolutional speed of the transmission output shaft 4, and an input signal from an oil temperature sensor 12 for detecting a transmission fluid temperature C.

Figure 3:
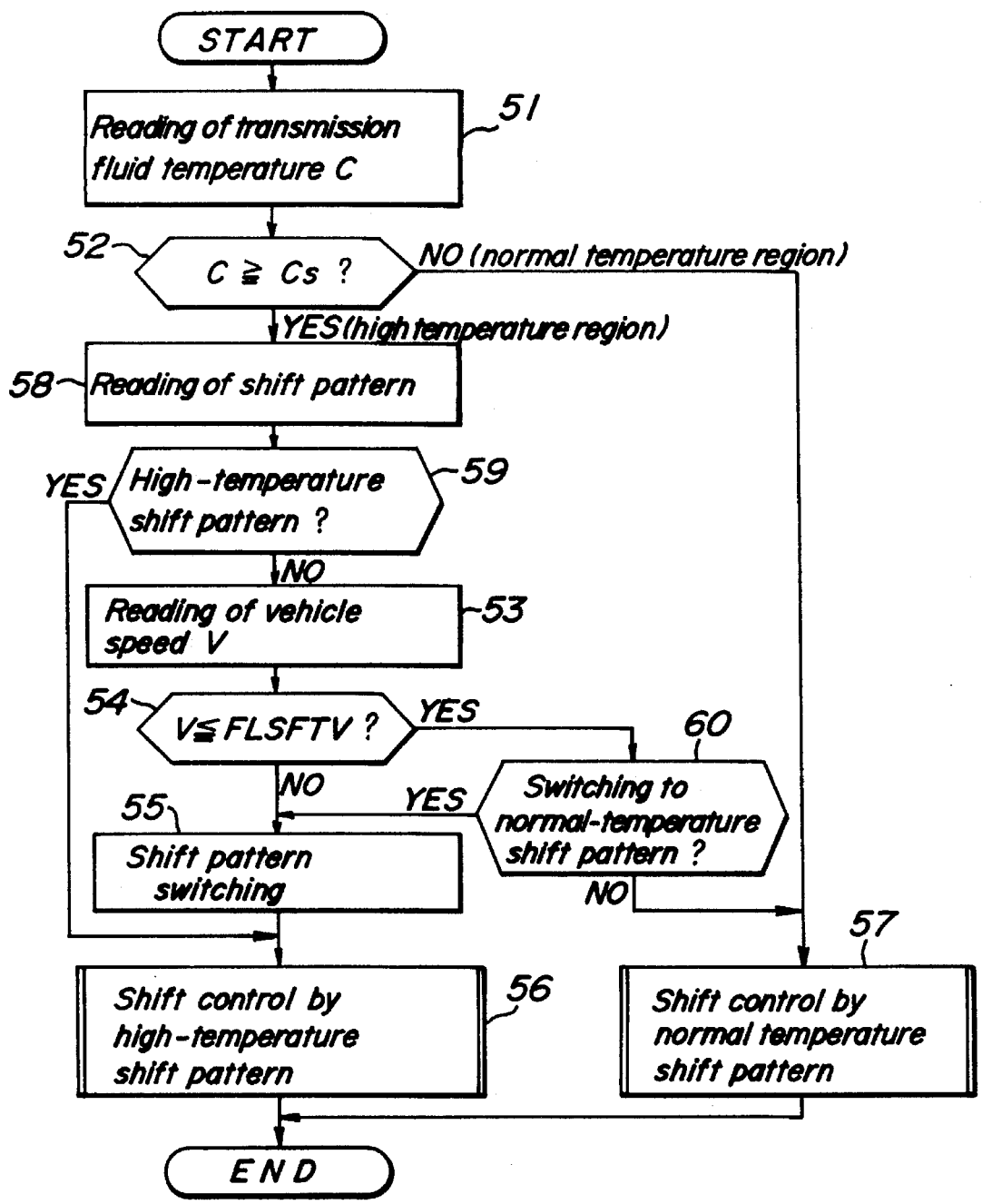
FIG. 3 is a flowchart showing a control program of a change-speed control carried out by a controller according to the same embodiment of the present invention.

The controller 9 performs a shift control intended by the present invention, by executing a control program shown in FIG. 3. Besides, the controller 9 performs the lock-up control by executing a lock-up control program (not shown) on the basis of the input information. The lock-up control may be of a normal type control wherein a judgment is made as to which of the lock-up region and the converter region the current driving state belongs, based on the throttle opening TH and the vehicle speed V and in accordance with a look-up method which uses a table data corresponding to a lock-up vehicle speed diagram, not shown, and a duty control is carried out with the driving duty D of the lock-up solenoid 8 which is determined in accordance with the judgment result, so as to selectively obtain the lock-up mode or the converter mode of the torque converter.

FIG. 3 is a flowchart showing a shift control program of which is repeatedly executed by the fixed time interruption of the controller 9. First of all, in the step 51 of FIG. 3, the transmission fluid temperature C is read by the temperature sensor 12, and a judgment is made in the subsequent step 52 as to whether the detected temperature C is not less than a predetermined temperature Cs and thus belongs to a high-temperature region. Here, it is assumed that the predetermined temperature Cs is set to a temperature (approximately 124° C., for example) which is unlikely attained by the heating in the lock-up mode under a normal driving condition. Therefore, the step 52 is to monitor whether the transmission fluid temperature C belongs to the high-temperature region which is unlikely achieved during a normal driving condition, or whether the transmission fluid temperature C belongs to an ordinary temperature region.

Figure 4A:
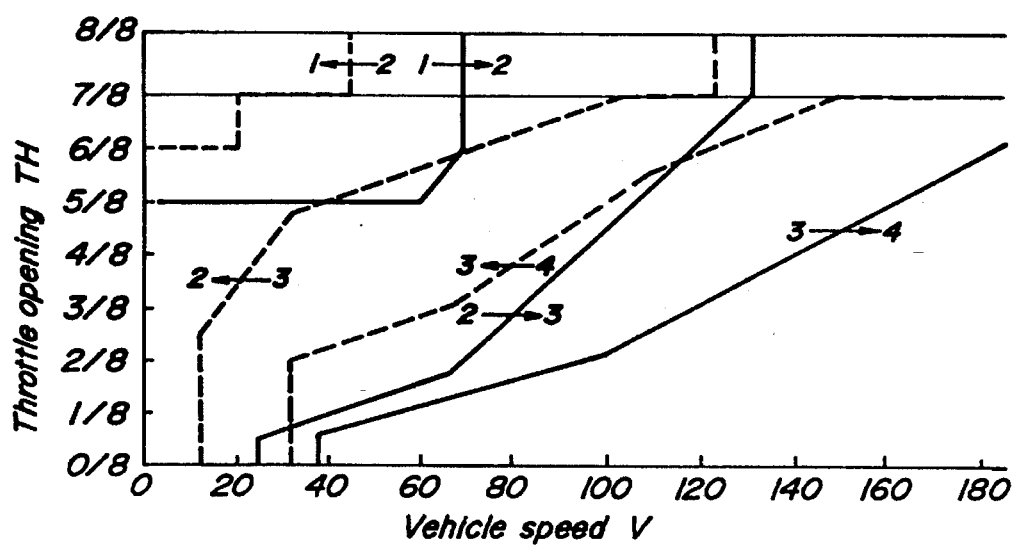
FIGS. 4A and 4B graphs showing an ordinary-temperature shift pattern and a high-temperature shift pattern used for the shift control of the automatic transmission to which the present invention may be applied.

When the transmission fluid temperature C has been judged to belong to the ordinary temperature region in the step 52, there does not take place the switching of the shift control means upon increase in the temperature as intended by the present invention, so that the control advances to the step 57 to perform a normal shift control with the current shift pattern, i.e., the normal-temperature shift pattern indicated by the solid lines and broken lines in FIG. 4A. In the normal shift control, there is obtained a speed range which is optimum for the current driving state, e.g., from the table data corresponding to the ordinary-temperature shift pattern, by using the look-up method in accordance with the throttle opening TH read by the throttle opening sensor 10 and the vehicle speed V read by the vehicle speed sensor 11, and the shift solenoids 6 and 7 are turned ON and OFF to achieve an optimum speed range.

On the other hand, when the transmission fluid temperature C has been judged to belong to the high-temperature region in the step 52, there takes place the switching of the shift control means upon increase in the temperature as intended by the present invention, regardless of existence or absence of change in the vehicle speed V and the throttle opening TH, so that the control advances to the control advances to the step 58 to read the current shift pattern, and a judgment is made in the step 59 to determine whether or not the current shift pattern is the high-temperature shift pattern. If the current shift pattern has been judged to be the normal-temperature shift pattern, the control advances to the steps 53, 54 and 55 wherein the shift pattern is switched in accordance with judgment of the vehicle speed if the current shift pattern is the high-temperature shift pattern. If, on the other hand, the current shift pattern has been judged to be the high-temperature shift pattern, the control proceeds directly to the step 56, skipping the steps 53 to 55. In this connection, the vehicle speed V is read from the vehicle speed sensor 11 in the step 53, and the judgment is made as to whether the vehicle speed V is lower than a predetermined vehicle speed FLSFTV in the subsequent step 54. In such a case, the predetermined vehicle speed FLSFTV may be the lower limit vehicle speed which is permissible for the normal transmission fluid temperature judgment for the top speed range in the case of a four-speed automatic transmission (e.g., 45 km/h).

If it has been judged that V<FLSFTV, depending upon the driving state of the vehicle, there may occur unintended shift operation, e.g., a shift operation from the top speed range to the second speed range in the four-speed automatic transmission, thereby giving an unpleasant feel to the driver and/or passengers. Thus, the control advances to the step 57 for completely inhibiting the switching to the high-temperature shift pattern in order to perform the normal shift control based on the normal-temperature shift pattern, except when it has been determined in the subsequent step 60 that there took place a shift operation based on the normal temperature shift pattern. It is thus possible to positively inhibit an unintended shift operation in the hatched region in FIG. 4B where the vehicle speed V is lower than FLSFTV.

Meanwhile, if it has been judged in the step 54 that V>FLSFTV, irrespectively of the driving state of the vehicle, there cannot occur unintended shift operation so that the control advances to the step 55 to effect a switching from the normal-temperature shift pattern to the high-temperature shift pattern, just as the case wherein it has been determined in the step 60 that there took place a shift operation based on the normal temperature shift pattern. As to the switching of the shift pattern, it is of course that the high-temperature shift pattern is maintained if that pattern has already been selected and maintained.

Figure 4B:
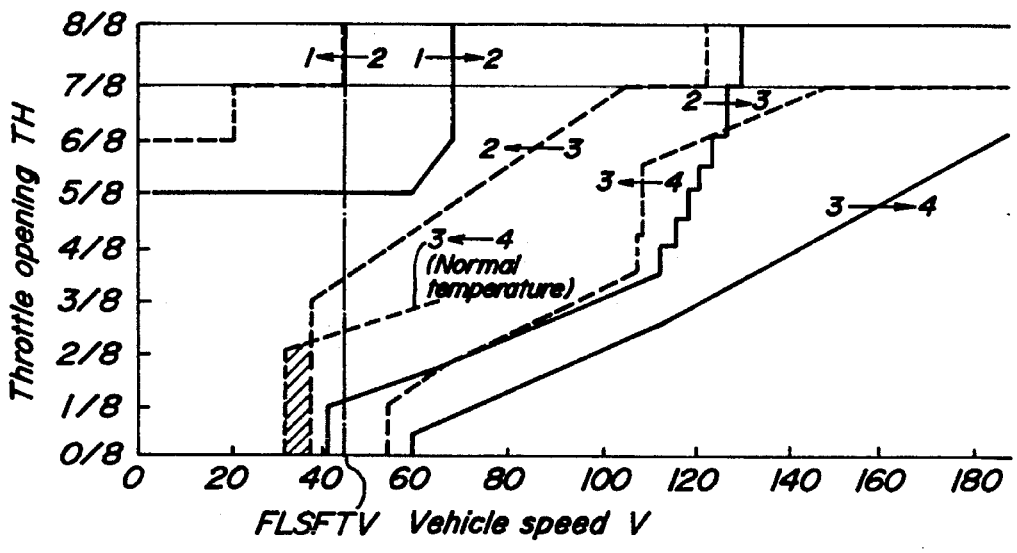

The following step 56 is to carry out a shift control suitable for a high temperature condition, based on the high-temperature shift pattern such as that shown in FIG. 4B, which corresponds to the high-temperature shift control means. With the high-temperature shift pattern, the speed optimum for the current driving state is obtained, e.g., from the table data corresponding to the high-temperature shift pattern indicated by the solid lines and the broken lines in FIG. 4B by a look-up method in accordance with the throttle opening TH read by the throttle opening sensor 10 and the vehicle speed V read by the vehicle speed sensor 11, and a predetermined shift operation is carried out by turning ON and OFF the shift solenoids 6 and 7 such that the optimum speed can be selected, thereby preventing the transmission fluid temperature from an excessive elevation during a continuous high-load driving, such as up-hill driving.

In the above explanation, the controller 9 corresponds to the temperature detecting means, high-temperature judging means and vehicle speed detecting means in the steps 51, 52 and 53, respectively, and also to shift pattern switching means, shift pattern switching inhibiting means and shift pattern switching inhibition releasing means, respectively, in the process from NO of the step 54 to the step 55, YES of the step 54 and NO of the step 60, respectively.

In the shift operation with the normal-temperature shift pattern in the step 57, the judgment is made in the step 60 upon the case where the shift operation took place with the variation in the driving state, i.e., the vehicle speed V and the throttle opening TH, and the shift pattern switching in the step 55 is carried out. This is because the driver is free from unpleasant feel even when the shift pattern is switched to the high-temperature shift pattern just as the case of the normal shift operation.

As described above, in the illustrated embodiment, the switching to the high-temperature shift pattern is inhibited when the vehicle speed V is lower than FLSFTV which is the lower limit vehicle speed permissible for the normal oil temperature judgment for the top speed range in the four-speed automatic transmission, even if the transmission fluid temperature C satisfies conditions for switching to the high-temperature shift pattern, so that it is possible to positively prevent undesirable shift operation from the top speed range to the second speed range in the four-speed automatic transmission. Further, the switching from the normal-temperature shift pattern to the high-temperature shift pattern is carried out during a continuous high-load driving, thereby preventing an excessive increase in the transmission temperature temperature.

It will be appreciated from the foregoing description that the present invention provides an improved shift control apparatus for an automatic transmission, that performs switching between a plurality of shift patterns in accordance with the transmission fluid temperature, without causing an undesirable shifting operation upon increase in a temperature related to the transmission or engine.

While the present invention has been described with reference to a specific embodiment, it is of course that various changes or modifications may be made without departing from the scope of the invention.

Thus, although the transmission fluid temperature of the automatic transmission has been detected in the illustrated embodiment, there may be used an engine coolant temperature.

We claim:

1. A shift control apparatus for a vehicle automatic transmission comprising:

a normal-temperature shift control means for providing a first shift pattern and performing a shift operation under a normal temperature condition, based on said first shift pattern;

a high-temperature shift control means for providing a second shift pattern and performing a shift operation under a high temperature condition, based on said second shift pattern;

a temperature detecting means for detecting a temperature which is related to at least one of an automatic transmission and an engine connected to said transmission;

a high-temperature judging means for judging whether or not the temperature detected by said temperature detecting means is higher than a predetermined temperature;

a shift pattern switching means for performing a switching between said normal-temperature shift control means and said high-temperature shift control means, and activating said high-temperature shift control means when the temperature detected by said temperature detecting means has been judged to be higher than said predetermined temperature;

a vehicle speed detecting means for detecting a vehicle speed; and a shift pattern switching inhibiting means for inhibiting the switching between said normal-temperature shift control means and said high-temperature shift control means by said shift pattern switching means, even when the temperature detected by said temperature detecting means has been judged by said high-temperature judging means to be higher than said predetermined temperature, if the vehicle speed detected by said vehicle speed detecting means is lower than a predetermined speed.

2. A shift control apparatus as set forth in claim 1, further comprising a shift pattern switching inhibition releasing means for releasing the inhibition of the switching between said normal-temperature shift control means and said high-temperature shift control means, so that when a shift operation is to be made with the switching from said normal-temperature shift control means inhibited by said shift pattern switching inhibiting means, said shift pattern switching inhibiting means is released and a switching into said high-temperature shift control means is performed.

3. A shift control apparatus as set forth in claim 1, wherein said temperature to be detected by said temperature detecting means is a transmission fluid temperature.

* * * * *